United States Patent [19]

Dowdakin, Sr.

[11] Patent Number: 4,547,101
[45] Date of Patent: Oct. 15, 1985

[54] SELF-ALIGNING TOOL HOLDER

[76] Inventor: William J. Dowdakin, Sr., 1019 S. Independence Ave., Rockford, Ill. 61102

[21] Appl. No.: 533,864

[22] Filed: Sep. 20, 1983

[51] Int. Cl.⁴ .......................................... B23B 31/00
[52] U.S. Cl. .................................... 408/127; 279/16; 10/141 H; 403/331; 403/378; 464/155; 464/904
[58] Field of Search ...................... 279/16, 18, 99, 100, 279/17; 408/127, 139, 239 R, 226; 10/141 H; 464/104, 155, 904; 403/331, 354, 378

[56] References Cited

U.S. PATENT DOCUMENTS

| 2,550,635 | 4/1951 | Brown et al. | 276/16 |
| 2,574,016 | 11/1951 | Burg | 10/89 |
| 2,820,378 | 1/1958 | Randles et al. | 82/1.2 |
| 2,965,400 | 12/1960 | Lehman | 464/104 |
| 3,171,145 | 3/1965 | Benjamin et al. | 10/129 |
| 3,454,283 | 7/1969 | Benjamin et al. | 279/16 |
| 3,491,625 | 1/1970 | Schulze | 408/127 |
| 3,658,434 | 4/1972 | Benjamin et al. | 408/239 |
| 3,945,751 | 3/1976 | Johnson | 408/127 |
| 4,021,132 | 5/1977 | Benjamin et al. | 408/127 |

Primary Examiner—Gil Weidenfeld
Assistant Examiner—Daniel W. Howell
Attorney, Agent, or Firm—Leydig, Voit & Mayer, Ltd.

[57] ABSTRACT

A tool holding member is coupled to a driving or spindle member by a lug-and-slot universal type coupling member. The three members are held against axial separation by a pair of resiliently yieldable retaining rings which coact with the coupling member to allow the tool holding member to float radially relative to the spindle member. Means are provided for locking tools of various diameters in the tool holding member while providing a positive drive between the holding member and the tool.

11 Claims, 5 Drawing Figures

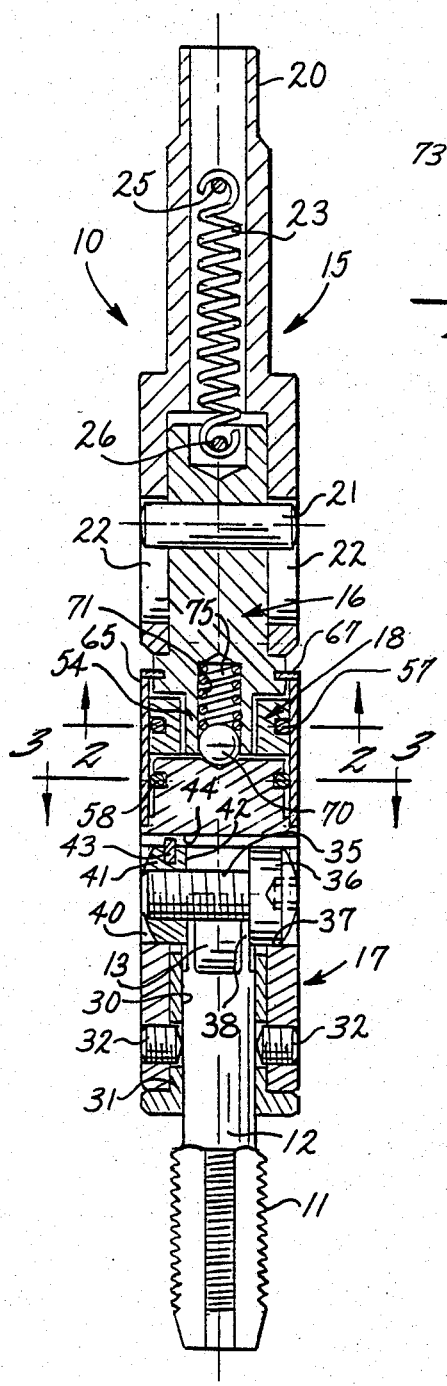
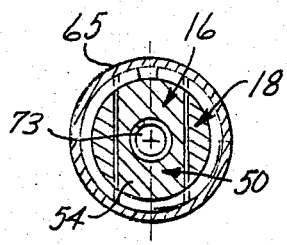
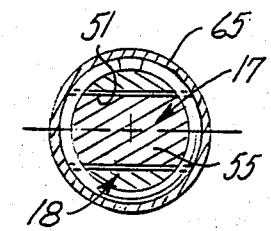
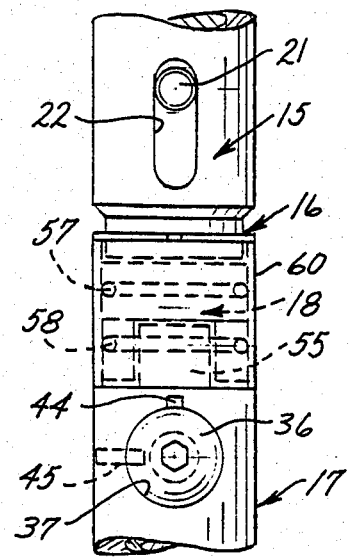
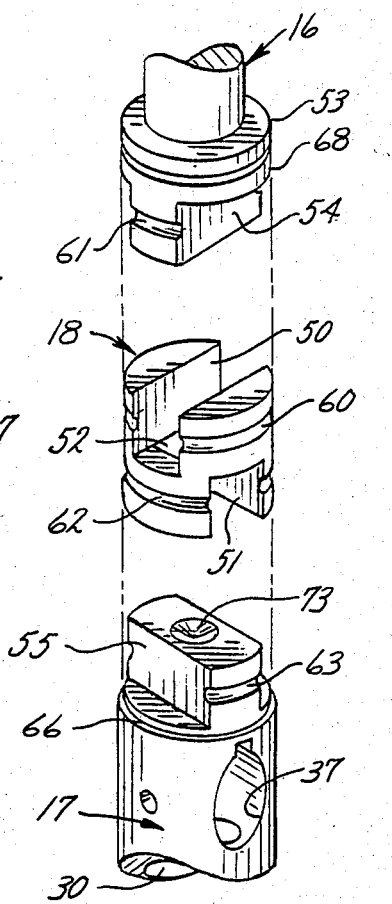

SELF-ALIGNING TOOL HOLDER

BACKGROUND OF THE INVENTION

This invention relates to a self-alining tool holder for a tool such as a tap, a reamer, or the like.

When a tool of the foregoing type is fed toward a bore in a workpiece, there rarely is perfect alinement between the tool and the bore. Even if perfect alinement does exist, the tool may tend to chatter as it initially enters the bore. To overcome these problems, several types of self-alining or floating tool holders have been developed. In such a tool holder, a tool holding member is drivingly coupled to a spindle member but is permitted to float radially relative to the spindle member so as to compensate for any misalinement between the centerline of the spindle member and the centerline of the bore. One example of a self-alining tool holder is disclosed in Randles et al U.S. Pat. No. 2,820,378.

SUMMARY OF THE INVENTION

The general aim of the present invention is to provide a new and improved self-alining tool holder which, when compared with prior tool holders of the same general type, is relatively compact in the radial direction so as to enable the diameter of the tool holder to be small in proportion to the diameter of the largest tool adapted to be held by the holder. As a result of the radially compact construction of the tool holder, several of the tool holders may be mounted with close center-to-center spacing on a multiple-spindle machine tool head.

A more detailed object of the invention is to achieve the foregoing by providing a tool holder in which the spindle member and the tool holding member are uniquely connected to a universal-type coupling member by resiliently yieldable retaining rings which connect the three members in a radially compact manner while allowing universal radial floating of the holding member.

Another object of the invention is to provide a floating tool holder in which the tool holding member is automatically recentered relative to the spindle member when the tool is withdrawn from the bore.

Still another object is to provide extremely simple means for clamping tools of various diameters in the holding member and for effecting a positive drive between the holding member and the tool.

These and other objects and advantages of the invention will become more apparent from the following detailed description when taken in conjunction with the accompanying drawings.

BRIEF DESCRIPTION OF THE DRAWINGS

FIG. 1 is a cross-sectional view taken axially through a new and improved self-alining tool holder incorporating the unique features of the present invention.

FIGS. 2 and 3 are cross-sections taken substantially along the lines 2—2 and 3—3, respectively, of FIG. 1.

FIG. 4 is a side elevational view of one portion of the tool holder.

FIG. 5 is an exploded perspective view of certain parts of the tool holder.

DETAILED DESCRIPTION OF THE PREFERRED EMBODIMENT

As shown in the drawings for purposes of illustration, the invention is embodied in a self-alining holder 10 for a tool such as a tap 11 for forming threads in a bore in a workpiece (not shown). The tap is of conventional construction and includes a shank 12 with a square upper end portion 13. In the usual tapping operation, the tap is rotated and, at the same time, is fed into the work at a rate somewhat slower than the lead of the tap so that the tap tends to draw itself into the bore as it forms the thread. It will be appreciated, however, that the tool holder 10 may be held rotationally and/or axially stationary and that the threading action may be effected by rotating and/or feeding the workpiece.

The tool holder 10 comprises four basic components, namely, a shank member 15, a spindle or driving member 16, a tool holding member 17 and a coupling member 18 for connecting the spindle member to the tool holding member. The shank member 15 is of tubular construction and includes a square upper end portion 20 adapted to be gripped by the collet of a rotatable machine tool spindle (not shown). The upper end portion of the spindle member 16 is telescoped slidably into the lower end portion of the shank member 15 and is retained therein by a pin 21 whose end portions extend slidably through axially extending slots 22 formed through the sides of the shank member. When the tap 11 enters the bore in the workpiece, the threading action of the tap pulls the spindle member 16 downwardly relative to the shank member 15 as permitted by the sliding fit of the pin 21 in the slots 22. When the tap is withdrawn from the workpiece, a contractile spring 23 returns the spindle member 16 upwardly to its original position (FIG. 1) relative to the shank member 15, the spring being stretched between roll pins 25 and 26 extending radially through the shank member and the spindle member, respectively.

The tool holding member 17 is formed with a downwardly opening socket 30 for receiving a flanged centering bushing 31 which, in turn, receives a portion of the shank 12 of the tap 11. When the tap is replaced with a tap of different diameter, the bushing 31 is replaced with a bushing having an inside diameter corresponding to the diameter of the shank of the new tap. Diametrically opposed dogpoint set screws 32 extend into the socket 30 and through the bushing 31 and engage the shank 12 to lock the bushing and shank within the socket.

Advantageously, unique means are provided for clamping the tool holding member 17 to the square upper end portion 13 of the shank 12 with a positive drive which automatically centers itself on taps of all sizes. Herein, these means comprise a screw 35 having a head 36 disposed within a radially extending hole 37 formed through the holding member 17 at the upper end portion of the socket 30, the head of the screw being formed with a flat inner face 38 which is located within the socket. Located within a diametrically opposite hole 40 in the holding member 17 is a nut 41 having a flat inner face 42 disposed within the socket 30. A roll pin 43 driven radially into one side of the nut 41 fits slidably into a keyway 44 formed in the holding member 17 at the upper ends of the socket 30 and the holes 37 and 40 and prevents the nut from rotating while permitting the nut to slide in the hole 40 when the screw 35 is turned. The screw and nut assembly is captivated endwise in the holes 37 and 40 by a roll pin 45 (FIG. 4) extending radially from the holding member 17 and a short distance into the socket 30 and located to engage either the nut or the head of the screw if the entire assembly tends to move endwise in the holes.

With the foregoing arrangement, the screw 35 initially is loosened to space the flat face 38 of the screw head 36 from the flat face 42 of the nut 41 by a sufficient distance to permit the square upper end portion 13 of the shank 12 of the tap 11 to be slipped upwardly between the two faces. Upon subsequent tightening of the screw 35, one of the faces 38, 42 first moves toward and engages one side of the square end portion 13 of the shank 12 whereupon, with continued tightening of the screw, the other face moves toward and clamps the opposite side of the square end portion. As the final clamping action occurs, the two opposing flat faces 38 and 42 center themselves on the square end portion 13 of the shank 12 and effect a positive rotational drive between the shank and the holding member 17. The centering action is effective regardless of the diameter of the shank.

The coupling member 18 connects the tool holding member 17 to the spindle member 16 in such a manner as to permit the tool holding member and the tap 11 to float radially and accommodate any misalinement between the centerline of the spindle member and the bore in the workpiece. In accordance with the primary aspect of the present invention, the spindle member 16, the holding member 17 and the coupling member 18 are uniquely formed and are uniquely connected together so as to permit radial floating of the holding member while keeping the diameter of the overall tool holder 10 comparatively small in relation to the diameter of the tap.

More specifically, the coupling member 18 herein is in the form of a generally cylindrical block. A slot 50 (FIG. 5) of rectangular cross-section is formed in one end portion of the coupling member and is equal in depth to one-half the height of the coupling member. An identical slot 51 of the same depth is formed in the opposite end portion of the coupling member but extends at a right angle to the slot 50. As a result of the arrangement of the slots, a square opening 52 (FIG. 5) is left in the center of the coupling member adjacent the bottoms of the slots.

The lower end portion of the spindle member 16 is formed with a radially projecting flange 53 (FIG. 5) whose lower end, in turn, is formed with a lug 54 having arcuate ends. The lug is sized to fit with sliding clearance in the slot 50 as shown in FIG. 2. A similar lug 55 (FIG. 5) is formed on the upper end of the holding member 17 and is sized to fit with sliding clearance in the slot 51 (see FIG. 3). The lug 55 is, of course, disposed at a right angle to the lug 54. When the spindle member 16 is rotated, the drive is transmitted to the holding member 17 via the lug 54, the coupling member 18 and the lug 55.

In carrying out the invention, retaining rings 57 and 58 (FIGS. 1 and 4) captivate the lugs 54 and 55 axially in the slots 50 and 51 while permitting the lugs to float radially in the slots. The rings preferably are made of resiliently yieldable material such as round spring wire. The ring 57 is seated in a circumferential groove 60 (FIG. 5) formed in the upper end portion of the coupling member 18 and in alined grooves 61 formed around the arcuate ends of the lug 54. Similarly, the ring 58 is seated in a circumferential groove 62 formed around the lower end portion of the coupling member and in alined grooves 63 formed around the arcuate ends of the lug 55. The diameter of each of the grooves 60 and 62 is slightly larger than the relaxed inside diameter of the rings 57 and 58 and is slightly larger than the diameter of the grooves 61 and 63. Thus, the rings resiliently grip the coupling member 18 and grip the lugs 54 and 55 with somewhat less force.

Because of the resilient nature of the rings 57 and 58 and the differential diameter of the grooves 60 and 62 relative to the grooves 61 and 63, the lugs 54 and 55 are capable of shifting radially through a limited range within the slots 50 and 51. Thus, the lugs and slots act in the manner of a universal joint to allow the holding member 17 to shift radially relative to the spindle member 16 and to enable the tap 11 to center itself on the centerline of the bore of the workpiece even though such centerline may be radially offset from the centerline of the spindle member. In addition, the lugs and slots permit the holding member 17 to tilt angularly relative to the spindle member 16 through a limited distance so as to compensate for any angular misalinement between the spindle member and the bore. While the rings permit radial shifting of the holding member, they also serve to securely captivate the spindle member 16, the coupling member 18 and the holding member 17 against axial separation. Importantly, the rings perform their retaining function without increasing the diameter of any of the three members 16, 17 and 18. Thus, the overall diameter of the tool holder 10 is kept relatively small. This enables several of the tool holders to be clustered with close center-to-center spacing on a multiple-spindle machine tool head.

Preferably, the coupling member 18 and the lugs 54 and 55 are surrounded by a sleeve 65 (FIGS. 1 to 4) which serves as a dust cover to prevent foreign material from accumulating between the lugs and the slots 50 and 51. The sleeve is captivated between a shoulder 66 (FIG. 5) formed around the upper end portion of the holding member 17 and a snap ring 67 (FIG. 1) which is fitted into a groove 68 (FIG. 5) formed around the flange 53 on the spindle member 16. In addition to serving as a dust shroud, the sleeve captivates the rings 57 and 58 radially and also limits radial travel of the lugs 54 and 55 in the slots 50 and 51.

Advantageously, means are provided for automatically re-centering the holding member 17 relative to the spindle member 16 when the tap 11 is withdrawn from the bore. In the present instance, these means comprise a spherical ball 70 (FIG. 1) which is slidably disposed in the square opening 52 in the coupling member 18 and in a hole 71 in the lug 54 and the spindle member 17. The ball normally is seated in a shallow frustoconical depression or seat 73 (FIG. 5) formed in the upper face of the lug 55. A coil spring 75 (FIG. 1) is disposed in the hole 71 and is compressed between the ball 70 and the upper end of the hole so as to press the ball into the seat 73.

When the lug 55 is shifted radially relative to the lug 54, the ball 70 rides upwardly along the tapered side of the seat 73. When the tap 11 is withdrawn from the bore, the spring-urged ball cams against the seat to shift the holding member 17 radially in the opposite direction and thereby automatically re-center the holding member.

I claim:

1. A self-alining holder for a tool, said holder comprising a spindle member and a holding member, means for connecting a tool to said holding member, and means for non-rotatably coupling said spindle member to said holding member while permitting said holding member to float radially relative to said spindle member, said coupling means comprising a coupling member disposed between said spindle member and said holding member, two slots disposed at right angles to one another and each having open ends, two lugs disposed at right angles to one another and received in said slots with sliding clearance, the ends of said lugs being located adjacent the ends of said slots, one of the complementary slot and lug sets being on one end of said coupling member and on the adjacent end of said spindle member, the other of the complementary slot and lug sets being on the opposite end of said coupling member and on the adjacent end of said holding member, axially spaced grooves around each of the complementary slot and lug sets, and separate retaining rings within each of said grooves and directly engagable with surfaces of said grooves to captivate said lugs axially in said slots while permitting the lugs to float radially within the slots.

2. A self-alining tool holder as defined in claim 1 in which the slots of said slot and lug sets are formed in opposite ends of said coupling member, the lug of one of said sets being on one end of said spindle member, and the lug of the other of said sets being on one end of said holding member.

3. A self-alining tool holder as defined in claim 2 in which each groove includes a first portion extending around the respective end of the coupling member and further inludes a second portion extending around the ends of the respective lugs, the diameter of each first groove portion being greater than the diameter of the associated second groove portion.

4. A self-alining tool holder as defined in claim 2 further including a sleeve captivated between said spindle and holding members and surrounding said retaining rings.

5. A self-alining tool holder as defined in claim 2 in which said slots intersect one another and leave an axially extending opening through the central portion of said coupling member, a ball disposed within said opening, a frusto-conical seat formed in the center portion of the lug on said holding member, and a spring loaded between said ball and said spindle member and urging said ball into said seat so as to normally center said holding member relative to said spindle member.

6. A self-alining tool holder as defined in claim 1 in which said holding member includes a socket for receiving a shank on the tool, a screw extending radially of the socket and having a head located within the socket adjacent one side thereof, a nut threaded on said screw and having one face located within said socket adjacent the other side thereof, and means anchoring said nut against turning relative to the socket while permitting the nut to slide radially of said socket whereby said head of said screw and said one face of said nut move toward one another and clamp the shank of said tool when said screw is tightened.

7. A self-alining holder for a tool, said holder comprising a rotatable driving member and a rotatable holding member, said holding member having a socket for receiving a shank on the tool, and means for drivingly coupling said driving member to said holding member while permitting said holding member to float radially relative to said driving member, said coupling means comprising a coupling member disposed between said driving member and said holding member, a pair of slots formed in opposite ends of said coupling member and extending at right angles to one another, each of said slots having open ends, a first lug on one end of said driving member and received with sliding clearance in one of said slots, a second lug on one end of said holding member and received with sliding clearance in the other of said slots, the ends of the lugs being located adjacent the ends of the slots, axially spaced grooves extending circumferentially around opposite end portions of said coupling member and around the ends of said lugs, and resiliently yieldable retaining rings seated in said grooves and directly engageable with the bottoms of said grooves to captivate said lugs axially in said slots while permitting the lugs to float radially within the slots.

8. A self-alining tool holder as defined in claim 7 in which each groove includes a first portion extending around the respective end of the coupling member and further includes a second portion extending around the ends of the respective lugs, the diameter of each first groove portion being greater than the diameter of the associated second groove portion.

9. A self-alining tool holder as defined in claim 7 further including a sleeve captivated between said driving and holding members and surrounding said retaining rings.

10. A self-alining tool holder as defined in claim 7 in which said slots intersect one another and leave an axially extending opening through the central portion of said coupling member, a ball disposed within said opening, a frusto-conical seat formed in the center portion of the lug on said holding member, and a spring loaded between said ball and said driving member and urging said ball into said seat so as to normally center said holding member relative to said driving member.

11. A self-alining tool holder as defined in claim 7 further including a screw extending radially of the socket in said holding member and having a head located within the socket adjacent one side thereof, a nut threaded on said screw and having one face located within said socket adjacent the other side thereof, and means anchoring said nut against turning relative to the socket while permitting the nut to slide radially of said socket whereby said head of said screw and said one face of said nut move toward one another and clamp the shank of said tool when said screw is tightened.

* * * * *